United States Patent
Shao (10) Patent No.: US 9,727,346 B2
(45) Date of Patent: Aug. 8, 2017

(54) SELECTING OR MODIFYING A THERMAL PROFILE BASED ON RECEIVING TEMPERATURE INFORMATION OF LOCATION OF COMPUTING DEVICE IN RESPONSE OF COMPLETION OF BOOT PROCESS

(71) Applicant: HEWLETT-PACKARD DEVELOPMENT COMPANY, L.P., Houston, TX (US)

(72) Inventor: Huo Shao, Shanghai (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/893,950

(22) PCT Filed: Aug. 30, 2013

(86) PCT No.: PCT/CN2013/082739
§ 371 (c)(1),
(2) Date: Nov. 25, 2015

(87) PCT Pub. No.: WO2015/027494
PCT Pub. Date: Mar. 5, 2015

(65) Prior Publication Data
US 2016/0162297 A1    Jun. 9, 2016

(51) Int. Cl.
*G06F 9/00* (2006.01)
*G05D 23/00* (2006.01)
*G06F 9/44* (2006.01)
*G06F 1/20* (2006.01)

(52) U.S. Cl.
CPC ............ *G06F 9/4401* (2013.01); *G06F 1/206* (2013.01); *Y02B 60/1275* (2013.01)

(58) Field of Classification Search
CPC ..................................................... G06F 9/4401
USPC ............................................................. 713/2
See application file for complete search history.

(56) References Cited

U.S. PATENT DOCUMENTS

| 6,029,119 | A | 2/2000 | Atkinson |
| 7,327,245 | B2 | 2/2008 | Krumm et al. |
| 8,154,421 | B2 | 4/2012 | Saltzman et al. |
| 8,489,250 | B2 * | 7/2013 | Aklilu ................. G05D 23/1917 165/201 |
| 8,749,254 | B2 * | 6/2014 | Su ....................... G01R 31/2817 324/750.03 |
| 9,031,545 | B1 * | 5/2015 | Srey ...................... H04W 4/046 340/3.1 |

(Continued)

FOREIGN PATENT DOCUMENTS

| CN | 1924750 | 3/2007 |
| CN | 103092292 | 5/2013 |

OTHER PUBLICATIONS

Katabira, K. et al.; "Real-time Monitoring of People Flows and Indoor Temperature Distribution for Advanced Air-conditioning Control"; Oct. 12-14, 2008; on pp. 664-668.

*Primary Examiner* — Suresh Suryawanshi
(74) *Attorney, Agent, or Firm* — HP Patent Department (57) ABSTRACT

A computing device may detect an ambient temperature and receive temperature information for a location of the computing device. The computing device may select a thermal profile for the computing device based on the ambient temperature. The computing device may modify the thermal profile based on the received temperature information.

20 Claims, 5 Drawing Sheets

(56) References Cited

U.S. PATENT DOCUMENTS

| | | | |
|---|---|---|---|
| 9,052,915 B2* | 6/2015 | Hallowell | G06F 1/206 |
| 9,261,863 B2* | 2/2016 | Sloop | G05B 15/02 |
| 9,341,190 B2* | 5/2016 | Berry | H05K 7/20836 |
| 2009/0256512 A1 | 10/2009 | Begun et al. | |
| 2009/0322472 A1 | 12/2009 | MacDonald et al. | |
| 2011/0301777 A1 | 12/2011 | Cox et al. | |
| 2016/0050789 A1* | 2/2016 | Bhattacharyya | G05B 15/02 700/282 |

* cited by examiner

[#](#) SELECTING OR MODIFYING A THERMAL PROFILE BASED ON RECEIVING TEMPERATURE INFORMATION OF LOCATION OF COMPUTING DEVICE IN RESPONSE OF COMPLETION OF BOOT PROCESS

BACKGROUND

When a user would like to manage thermal dissipation for a computing device, the user can use an input component such as a mouse or keyboard to access a BIOS (basic input/output system) of the computing device. The user can change settings corresponding to a cooling component to control thermal settings for the computing device. The user can save the settings for use each time the computing device powers on.

BRIEF DESCRIPTION OF THE DRAWINGS

Various features and advantages of the disclosed examples will be apparent from the detailed description which follows, taken in conjunction with the accompanying drawings, which together illustrate, by way of example, features of the disclosed embodiments.

DETAILED DESCRIPTION

A computing device can include at least one thermal profile for controlling thermal dissipation of the computing device. At least one of the thermal profiles can be selected or modified by the computing device based on a detected ambient temperature of the computing device and/or based on received temperature information. The temperature information can be included with weather information received as a weather forecast, corresponding to a physical location of the computing device.

By modifying or selecting a thermal profile based on the ambient temperature and based on received temperature information, the computing device can improve thermal management, reduce unnecessary noise produced by a thermal dissipation component, and/or conserve power for the computing device by anticipating the ambient temperature of the computing device changing based on the received temperature information corresponding to the location of the computing device. Further, by anticipating the ambient temperature changing based on the received temperature information, the computing device can reduce a likelihood that an operating temperature of the computing device increases significantly and suddenly, which may cause damage to components of the computing device. In addition, based on the received temperature information, the computing device can anticipate an amount of power to be used for cooling the computing device and proceed to conserve power to extend a battery run time of the computing device based on the anticipated power usage.

For the purposes of this application, a thermal profile includes data and/or settings used to control a thermal dissipation component, such as a mechanical fan and/or a liquid cooling component, of the computing device. For example, a thermal profile can include a temperature threshold for the computing device to control at what specified operating temperature the thermal dissipation component activates to dissipate heat from the computing device. In another example, the thermal profile can specify whether the thermal dissipation component is to dissipate nest based on operating modes of the computing device, such as an active mode or a passive moos of the computing device.

The computing device can include a thermal sensor, such as a thermometer, to initially detect the ambient temperature from an environment around the computing device if the computing device is in a low power or a power off state. The environment corresponds to a location, such as a room or building, where the computing device is located. The computing device proceeds to select a thermal profile for controlling the thermal dissipation component based on the detected ambient temperature in response to the computing device powering on.

In response to the computing device powering on the computing device detects a location of the computing device. The location corresponds to a physical location where the computing device is located. In one example, the location can include a geographical coordinate corresponding to the physical location. A communication component, such as a network interface component and/or a wireless radio, con communicate the location of the computing device to another device, such as a weather service provider.

The communication component then receives temperature information corresponding to the location of the computing device from the other device. The computing device uses the received temperature information in view of the ambient temperature to select a new thermal profile for controlling the thermal dissipation component. In another example, the computing device can modify the currently selected thermal profile for controlling the thermal dissipation component based on the received temperature information in view of the ambient temperature.

Figure 1:
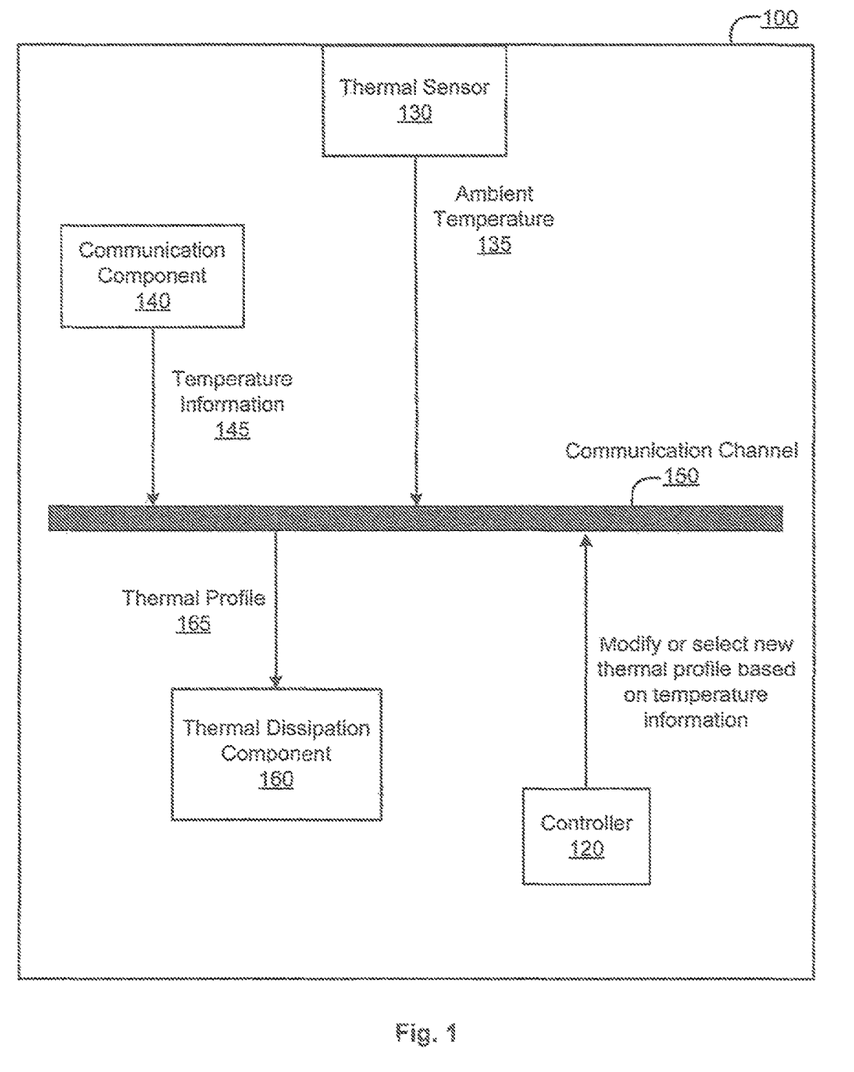
FIG. 1 illustrates an example of a computing device with a thermal sensor to detect an ambient temperature and a communication component to receive temperature information.

FIG. 1 illustrates an example of a computing device 100 with a thermal sensor 130 to detect ambient temperature 135 and a communication, component 140 to receive temperature information 145. The computing device 100 can be a desktop, a server, a notebook, a netbook, and/or an all-in-one system. In another example, the computing device 100 can be a tablet, a smart phone, a personal digital assistant (PDA), a cellular device, and/or any additional computing device to detect ambient temperature 135 and to receive temperature information 145.

The computing device 100 includes a controller 120, a thermal sensor 130, a communication component 140, a thermal dissipation component 160, and a communication channel 150 for the controller 120 and components of the computing device 100 to communicate with one another. In one implementation, the computing device 100 also includes a thermal module. The thermal module includes software, hardware, and/or firm ware which can be utilized independently and/or in conjunction with the controller 120 to manage thermal dissipation of the computing device 100. In one example, if the thermal module includes software and/or firmware, the thermal module can be stored on a non-volatile computer readable medium included in or accessible to the computing device 100.

The thermal sensor 130 is a hardware component, such as a thermometer, a bimetal thermometer, a thermocouple and/or a resistance temperature detector, which detects ambient temperature 135 around the computing device 100. The ambient temperature 135 corresponds to a temperature of the environment of the computing device 100, such as a room of where the computing device 100 is located. The thermal sensor 130 detects the ambient temperature 135 in measurements, such as Fahrenheit or Celsius, while the computing device 100 is in a power off state or a low power state. In another example, the thermal sensor 130 continues to detect the ambient temperature 135 if the computing device 100 is in a power on state.

The thermal sensor 130 passes the detected ambient temperature 135 to the controller 120 and/or the thermal module in response to the computing device 100 powering on. The controller 120 can be a processor, a semiconductor-based microprocessor, an integrated circuit (IC), and/or any other device syllable for managing thermal dissipation for the computing device 100. In one example, the controller 120 can include more than one integrated circuit (IC). In another example, the controller 120 can be a fan controller coupled to a thermal dissipation component 160.

The detected ambient temperature 135 is used by the controller 120 and/or the thermal module to select a thermal profile 165 for controlling the thermal dissipation component 160. For the purposes of this application, the thermal dissipation component 160 is a hardware component, such as a mechanical fan and/or a liquid cooling component, which reduces an operating temperature of the computing device 100 by removing heat produced from the computing device 100. The operating temperature corresponds to an internal temperature of the computing device 100.

The thermal profile 165 includes information, data, and/or settings used by the thermal dissipation component 160 to set temperature thresholds for the computing device 100, to control timing information for when the thermal dissipation component 160 activates, and/or to control operating speeds for the thermal dissipation component 160. The temperature threshold corresponds to a specified operating temperature of the computing device 100 which is not to be exceeded.

As the thermal profile 165 is used for the thermal dissipation component 160, the controller 120 and/or the thermal module identify the location of the computing device 100. In one example, the location is identified with a network address, such as an internet protocol address, corresponding to the computing device 100 or the communication component 140. In another implementation, the computing device 100 can further include location component, such as a global positioning system to detect a geographical coordinate corresponding to the physical location of the computing device 100.

In response to identifying the location, the controller 120 and/or the thermal module pass the location of the computing device 100 through a communication component 140 to another device. The communication component 140 is a hardware component, such as a network interface controller, a wireless radio, a Bluetooth component, a near field communication component, and/or an infrared component which, shares the location with another device and receives from the other device, temperature information 145 corresponding to the location of the computing device 100.

In one example, the other device can be a service provider, such as a weather station, which supplies weather information including the temperature information 145 to the computing device 100 as a weather forecast. The temperature information 145 includes temperature data corresponding to the physical location of the computing device 100. For example, the temperature information 145 can identify the temperature data as a measurement in Fahrenheit or Celsius for a zip code, a postal code, or a city where the computing device 100 is geographically located.

In response to receiving the temperature information 145, the controller 120 and/or the thermal module can modify the thermal profile 165 currently being used by the thermal dissipation component 160. In one example, modifying the current thermal profile 165 can include modifying a temperature threshold of the computing device 100. By modifying the temperature threshold, the controller 120 and/or the thermal module can control at what operating temperature the thermal dissipation component 160 operates to dissipate heat.

For example, if the temperature threshold is decreased, the thermal dissipation component 160 can begin to dissipate heat at an earlier time. Whereas if the temperature threshold is increased, the thermal dissipation component 160 delays thermal dissipation until the operating temperature of the computing device reaches the temperature threshold. In another example, modifying the thermal profile 165 includes modifying an operating speed for a fan component of the thermal dissipation component 160.

Figure 2:
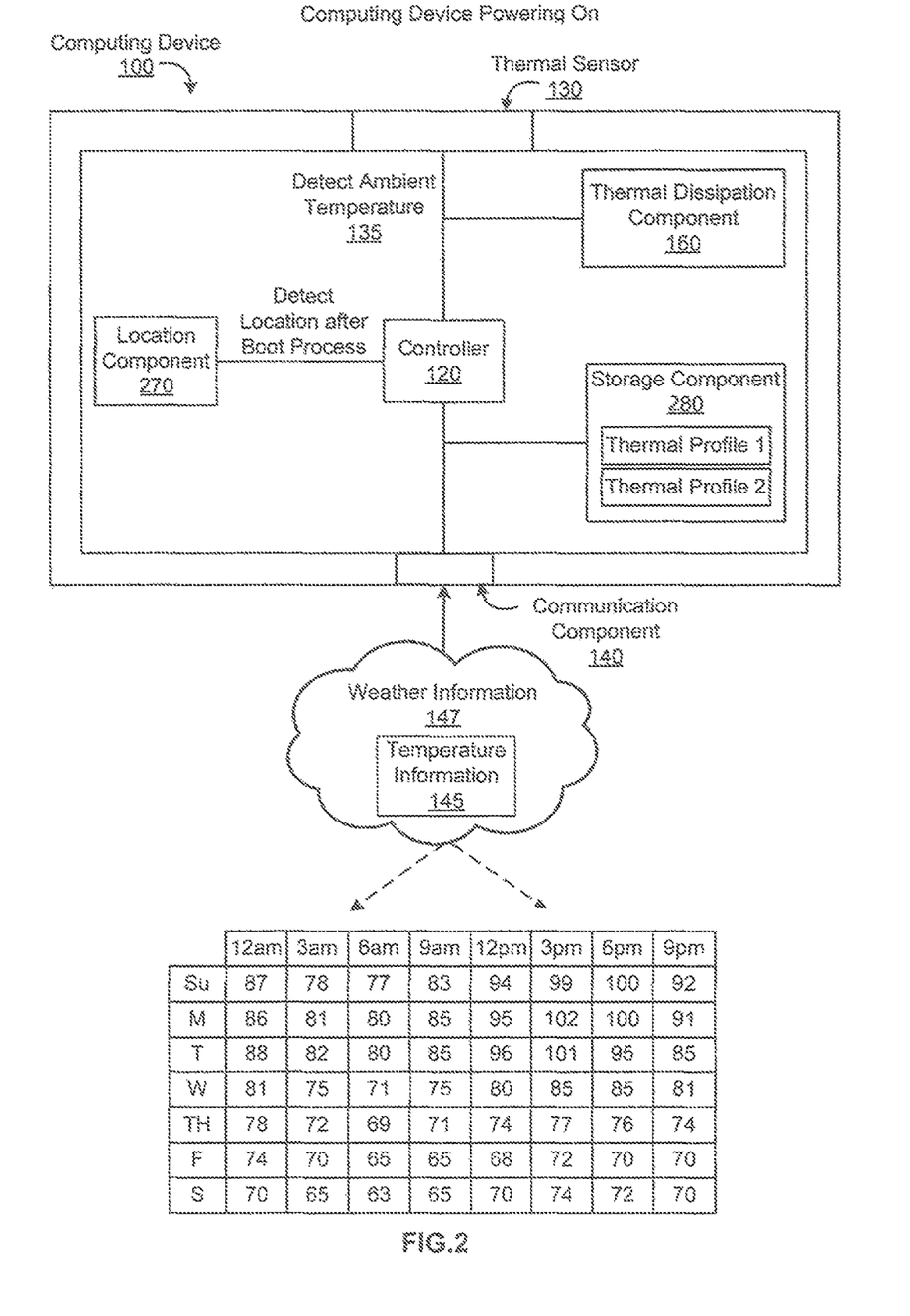
FIG. 2 illustrates an example of a computing device powering on to receive temperature information.

FIG. 2 illustrates an example of a computing device 100 powering on to receive temperature information 145. As noted above, the thermal sensor 130 initially detects the ambient temperature 135 if the computing device 100 is in a power off state or a low power state. While in the power off state or the low power state, the thermal sensor 130 can continuously or periodically detect the ambient temperature 135. The thermal sensor 130 can be a thermometer or any additional hardware device which detects a temperature of an environment of the computing device 100.

In one example, the thermal sensor 130 can be integrated or coupled with a panel of the computing device 100. In another example, the thermal sensor 130 can be an external device, such as a Universal Serial Bus thermometer de-vice, which detects the ambient temperature 135. The detected ambient temperature 135 can be stored on the thermal sensor 130 or stored on a storage component 280 of the computing device 100. The storage component 280 is a hardware component, such as a hard drive, an optical disc, random access memory, flash memory, and/or any additional volatile or non-volatile memory component which can store the ambient temperature 135.

In one implementation, the thermal sensor 130 can include a battery to supply power to the thermal sensor 130 while the computing device 100 is in the low power state or the power off state. In another implementation, the thermal sensor 130 receives power from a power source of the computing device 100, not shown, while the computing device 100 is in the low power or the power off state. The power source is a hardware component, such as a power supply, outlet, and/or battery, which supplies power to the thermal sensor 130 and other components of the computing device 100 while the computing device 100 is in at least one power state. The power states of the computing device 100 can include ACPI (Advanced Configuration and Power interface) power states, such as a G0, G1, G2, and/or G3 power state. In other examples, the power states of the computing device 100 also include a S0, S1, S2, S3, S4; and/or S5 power state.

The computing device 100 can power on from the low power or the power off state for a boot process of the computing device 100 to begin. Powering on can include the computing device 100 resuming from a low power state, such as a sleep state or a hibernation state. For the purposes of this application, the boot process includes the controller 120 and/or the thermal module executing a BIOS and/or an Operating System of the computing device 100. The boot process is complete if the BIOS and/or the Operating System are executed or loaded on the computing device 100.

After the boot process is complete, the thermal sensor 130 passes the detected ambient temperature 135 to the controller 120 and/or the thermal module. The controller 120 and/or the thermal module select a thermal profile for the thermal dissipation component 160 based on the ambient temperature 135. In one example, as shown in FIG. 2, the computing device 100 can include more than one thermal profile stored on the storage component 280. Each thermal profile can correspond to different ambient temperature ranges of the environment around the computing device 100.

In response to the computing device completing the boot process, the controller 120 and/or the thermal module also detect a location of the computing device 100. As noted above, the location corresponds to where the computing device 100 is physically located, in one example, the controller 120 and/or the thermal module can identify the location of the computing device 100 based on a network address, such as an internet protocol address, corresponding to the computing device 100. In another implementation, as shown in FIG. 2, the computing device 100 includes a location component 270, such as a global positioning system, to detect a geographical coordinate of the computing device 100.

In response to detecting the location, the communication component 140, such as a network interface component, a wireless radio, and/or a Bluetooth component, can detect for a network connection to share the location of the computing device 100 with another device. The other device can be another computing device, a server, and/or a service provider, such as a weather service provider, which provides the computing device 100 temperature information 145 corresponding to the location of the computing device 100.

In one example, as shown in FIG. 2, the temperature information 145 is included with weather information 147 received as a weather forecast corresponding to the geographic location of the computing device 100. As shown in FIG. 2, the weather forecast includes temperature information corresponding to days and hours of the location of the computing device 100. In another example, the weather forecast also includes additional weather information, soon as information for precipitation, humidity, and/or wind for the location.

The received weather information 147 with temperature information 145 can be stored in the storage component 280 of the computing device 100 for future use if a connection to the other device is not available. The controller 120 and/or the thermal module can use the temperature information 145 to modify a current thermal profile selected for the thermal dissipation component 160. In another implementation, the controller 120 and/or the thermal module can select a new thermal profile for the thermal dissipation component 160.

Figure 3:
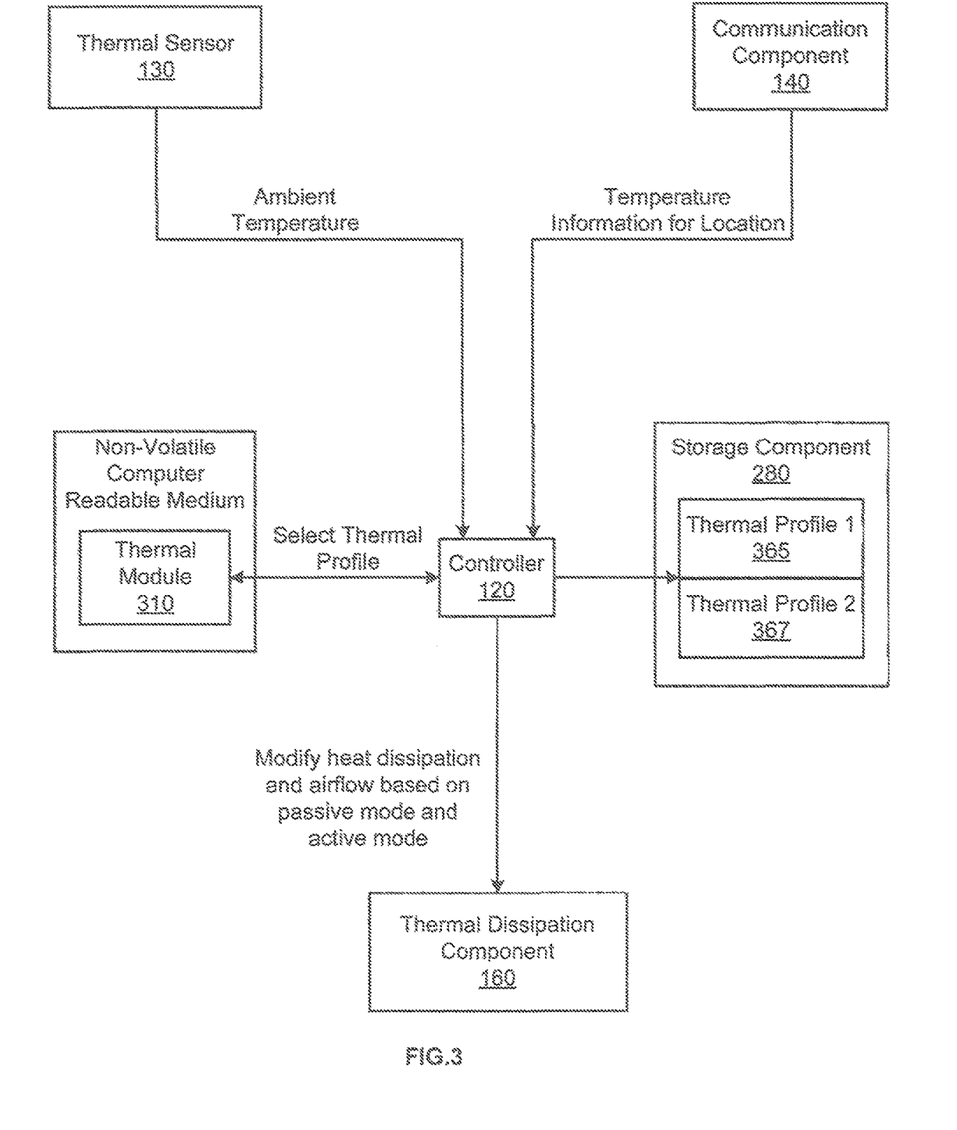
FIG. 3 illustrates an example of a block diagram of a thermal module managing a thermal dissipation component based on received temperature information.

FIG. 3 illustrates an example of a block diagram of a thermal module 310 managing a thermal dissipation component 160 based on received temperature information. As noted above, the thermal module 310 can be a hardware component such as a circuit integrated with or coupled to another component, such as the controller 120. In another implementation, the thermal module 310 is firmware embedded onto a component or the thermal module 310 is a software module executable by the controller 120 from a non-volatile computer readable medium. The non-volatile computer readable medium is a tangible apparatus that contains, stores, communicates, or transports the thermal module 310 as machine readable instructions for the computing device. In one embodiment, the non-volatile computer readable medium is a hard drive, a compact disc, a flash disk, a network drive or any other form of tangible storage apparatus coupled to the computing device.

The thermal dissipation component 160 can include a mechanical fan, a liquid cooling component, end/or any additional ham ware component which removes heat from the computing device to reduce an operating temperature of the computing device. The controller 120 and/or the thermal module 310 initially select a thermal profile for controlling the thermal dissipation component 160 based on the ambient temperature. In one example, as shown in FIG. 3, the computing device can include more than one thermal profile 365, 367 stored on the storage component 280. Each thermal profile can include, different settings, information, and/or data for different temperature ranges corresponding to the detected ambient temperatures and/or received temperature information.

In one example, the thermal profile can specify a temperature threshold for the computing device. If the operating temperature of the computing device reaches the temperature threshold, the thermal dissipation component activates to remove heat and to reduce or maintain the operating temperature of the computing device. In another example, the thermal profile includes settings for controlling timing information for the thermal dissipation component 160. The settings can specify different operating speeds for the thermal dissipation component when dissipating heat.

In other examples, the thermal profile can specify which operating modes of the computing device, such as a passive mode or an active mode, the thermal dissipation component 160 is to be operated in. The computing device can be in a passive mode if components, such as the controller 120, a processor, a graphics component, and/or the storage component 280 are not executing high load tasks which produce heal above a predefined threshold. The computing device can be in an active mode if at least one of the components of the computing device are processing high load task which produce heat above the predefined threshold.

In response to the communication component 140 receiving temperature information corresponding to the location of the computing device, the controller 120 and/or the thermal module 310 can select another thermal profile based on the received temperature information and/or the ambient temperature. The controller 120 and/or the thermal module 310 can select another thermal profile based on the received temperature information and/or the ambient temperature to anticipate the thermal dissipation component 160 activating at an earlier time to dissipating heat. In another example, the controller 120 and/or the thermal module 310 can select another thermal profile based on the received temperature information and/or the ambient temperature to anticipate the thermal dissipation component 160 increasing an amount of thermal dissipation.

For example, if the received temperature information includes temperature data which is higher than the ambient temperature, the controller 120 and/or the thermal module 310 select another thermal profile for a passive mode of the computing device which reduces the temperature threshold for the thermal dissipation component 160 to operate at an earlier time. In another example, if the received temperature information includes temperature data higher than the ambient temperature, the controller 120 and/or the thermal module 310 select another thermal profile for an active mode of the computing device which increases an operating speed of the thermal dissipation component 160 for the thermal dissipation component 160 to dissipate more heat.

Alternatively, if the received temperature information includes temperature data lower than the ambient temperature, the controller 120 and/or the thermal module 310 can delay the thermal dissipation component 160 from operating to dissipate heat. The controller 120 and/or the thermal module 310 can also reduce an operating speed or reduce an amount of heat being dissipated by the thermal dissipation component 160. As a result, the controller 120 and/or the thermal module 310 can conserve power and may extend a run time of the computing device if the computing device is receiving power from a battery. In other implementations, instead of selecting another thermal profile, the controller 120 and/or the thermal module 310 modify the selected thermal profile to control when the thermal dissipation component 160 begins to operate and to control operating speeds of the thermal dissipation component 160.

Figure 4:
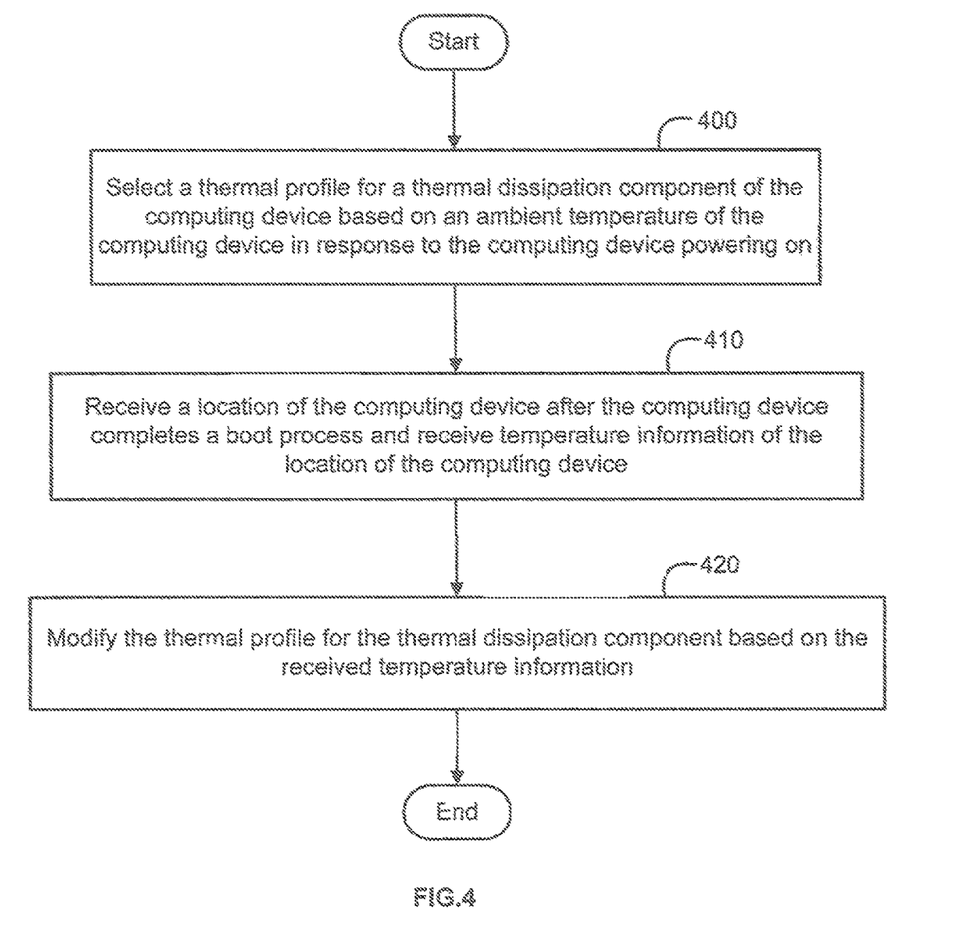
FIG. 4 is an example flow chart illustrating a method for managing thermal dissipation for a computing device.

FIG. 4 is a flowchart illustrating a method for managing thermal dissipation for a computing device according to an example. A thermal sensor initially detects an ambient temperature of the computing device for the controller and/or the thermal module to select a thermal profile for a thermal dissipation component at 400. The thermal profile is selected by the controller and/or the thermal application based on the ambient temperature in response to the computing device powering on. After the computing device completes a boot process, the controller and/or thermal module receive a location of the computing device and receive temperature information corresponding to the location of the computing device at 410. The controller and/or thermal module can then modify the thermal profile based on the received temperature information at 420. The method is then complete, in other embodiments, the method of FIG. 4 includes additional steps in addition to and/or in lieu of those depicted in FIG. 4.

Figure 5:
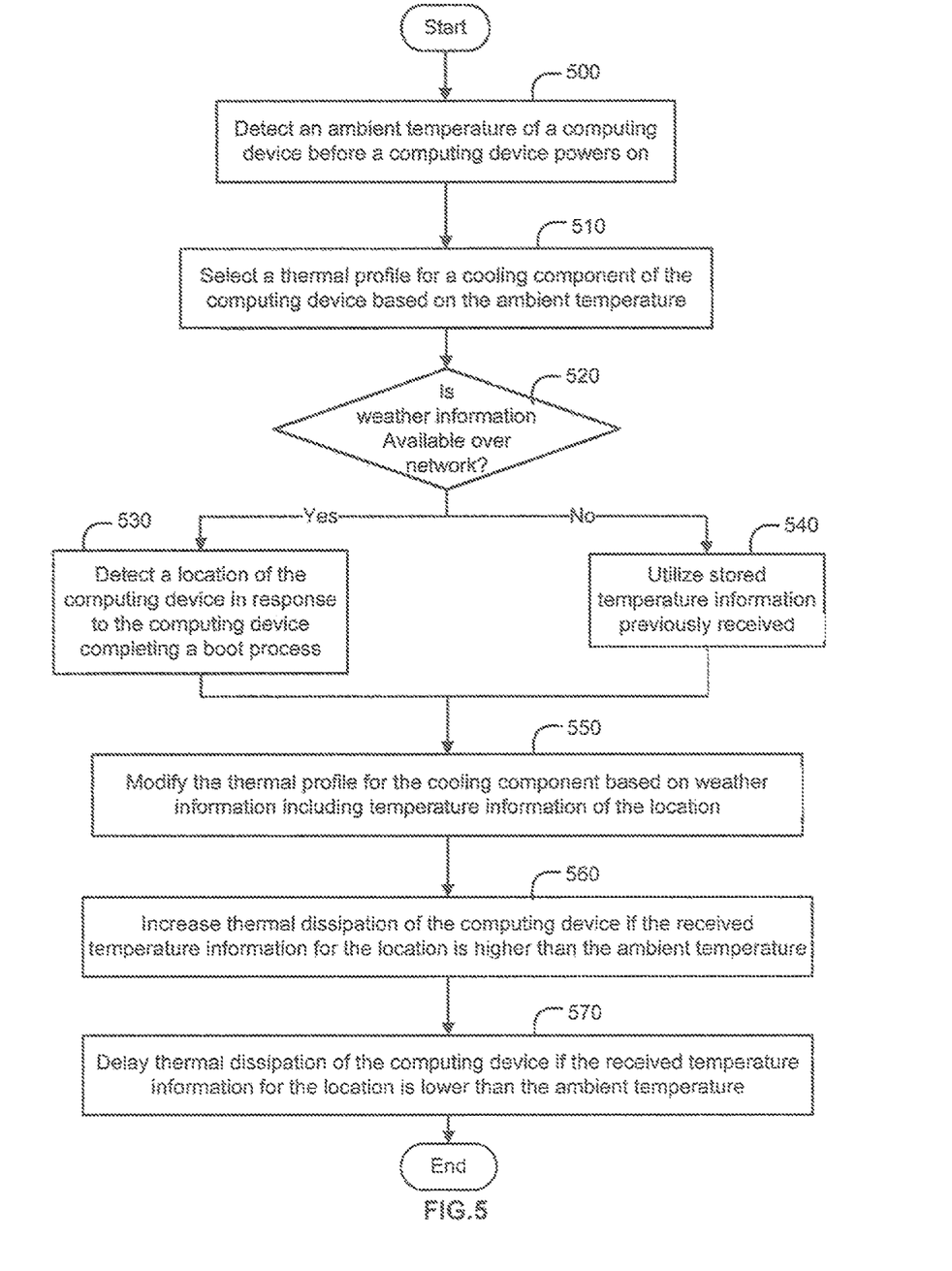
FIG. 5 is another example flow chart illustrating a method for managing thermal dissipation for a computing device.

FIG. 5 is a flow chart illustrating a method for managing thermal dissipation for a computing device according to another example. A thermal sensor initially detects an ambient temperature around a computing device before the computing device powers on at 500. In response to the computing device powering on, the controller and/or the thermal module select a thermal profile for a thermal dissipation component based on the detected ambient temperature at 510.

In response to the computing device completing a boot process to execute and/or load a BIOS and/or an operating system of the computing device, the controller and/or the thermal module detect if weather information including temperature information for a location of the computing device is available over a network at 520. As noted above, the weather information includes temperature information corresponding to the location of the computing device. In one example, if a network connection is available, the controller and/or the thermal application can detect a location of the computing device and communicate the location to another device to receive weather information with the temperature information corresponding to the location of the computing device at 530. In another example, if a network connection is not available, the controller and/or the thermal module can access a storage component of the computing device to determine whether previously stored temperature information is available at 540.

The controller and/or the thermal module use the temperature information from the received weather forecast or the previously stored temperature information to modify the thermal profile of the thermal dissipation component at 550. In one example, if the temperature information corresponding to the location of the computing device is higher than the detected ambient temperature of the computing device, the controller and/or the thermal module use the thermal profile to increase thermal dissipation of the computing device in a passive and active mode at 560. Increasing thermal dissipation can include decreasing a temperature threshold for an operating temperature of the computing device for the thermal dissipation component to increase an amount of heat dissipated from the computing device or to begin thermal dissipation at an earlier time.

In another example, if the temperature information of the location is lower than the detected ambient temperature of the computing device, the controller and/or the thermal module use the thermal profile to delay thermal dissipation for the computing device at 570. In other implementations, if no temperature if is received or previously stored, the controller and/or the thermal module can continue to use the selected thermal profile based on the ambient temperature and continue to detect for a connection to receive temperature information. The method is then complete. In other embodiments, the method of FIG. 5 includes additional steps in addition to and/or in lieu of those depicted in FIG. 5.

The invention claimed is:

1. A computing device comprising:
   a thermal sensor to detect an ambient temperature of the computing device;
   a thermal dissipation component to reduce an operating temperature of the computing device;
   a communication component to receive temperature information corresponding to a location of the computing device; and
   a controller to select a first thermal profile for the thermal dissipation component based on the ambient temperature in response to the computing device powering on, and the controller to select a different second thermal profile for the thermal dissipation component based on the received temperature information and the ambient temperature in response to the computing device completing a boot process.

2. The computing device of claim 1, wherein the computing device powers on from at least one of a power off state or a low power state to start the boot process.

3. The computing device of claim 1, wherein the boot process includes executing at least one of a BIOS (Basic Input/Output System) or an operating system of the computing device, and
   wherein the boot process is complete once at least one of the BIOS or the operating system has been executed.

4. The computing device of claim 1, wherein the controller is to identify the location of the computing device based on a network address of the computing device.

5. The computing device of claim 1, further comprising a location component to detect a geographic coordinate of the computing device.

6. The computing device of claim 1, wherein the communication component is to transmit the location of the computing device to another device, and the communication component is to receive the temperature information from the other device as a weather forecast corresponding to the location of the computing device.

7. The computing device of claim 1, wherein the controller is to select the second thermal profile based on the received temperature information to anticipate dissipating heat at an earlier time or to anticipate increasing an amount of thermal dissipation.

8. A method for managing thermal dissipation of a computing device, comprising:
- selecting, by the computing device, a thermal profile for a thermal dissipation component of the computing device based on an ambient temperature detected by a thermal sensor of the computing device in response to the computing device powering on; and
- in response to the computing device completing a boot process:
  - detecting a location of the computing device,
  - receiving, over a network from a remote device, temperature information of the location of the computing device; and
  - modifying the thermal profile for the thermal dissipation component based on the received temperature information of the location.

9. The method of claim 8, further comprising receiving and storing a weather forecast as temperature information in a storage of the computing device.

10. The method of claim 9, further comprising modifying the thermal profile based on the stored weather forecast if a connection is unavailable to receive the temperature information.

11. The method of claim 8, wherein modifying the thermal profile includes reducing a temperature threshold of the computing device in a passive mode for the thermal dissipation component to increase thermal dissipation of the computing device.

12. The method of claim 8, wherein modifying the thermal profile includes increasing an operating speed of a fan of the thermal dissipation component if the computing device is in an active mode.

13. A non-transitory computer readable medium storing instructions that when executed by a controller cause the controller to:
- detect an ambient temperature detected by a thermal sensor of a computing device before the computing device powers on;
- use a thermal profile for the computing device based on the ambient temperature in response to the computing device powering on; and
- in response to the computing device completing a boot process:
  - receive information of a location of the computing device,
  - receive, over a network from a remote device, weather information including temperature information for the location, and
  - modify the thermal profile of the computing device based on the received temperature information.

14. The non-transitory computer readable medium of claim 13, wherein a thermal dissipation component of the computing device increases thermal dissipation of the computing device if the received weather information includes temperature information that is higher than the ambient temperature.

15. The non-transitory computer readable medium of claim 13, wherein a thermal dissipation component of the computing device delays thermal dissipation of the computing device if the received weather information includes temperature information that is lower than the ambient temperature.

16. The computing device of claim 1, wherein the thermal dissipation component comprises a fan that is to operate according to a selected one of the first thermal profile and the second thermal profile.

17. The computing device of claim 1, wherein in response to the computing device completing the boot process, the controller is to select the different second thermal profile for the thermal dissipation component in response to the controller determining that the received temperature information is higher than the ambient temperature.

18. The computing device of claim 1, wherein in response to the computing device completing the boot process, the controller is delay operation of the thermal dissipation component in response to the controller determining that the received temperature information is lower than the ambient temperature.

19. The method of claim 8, wherein modifying the thermal profile for the thermal dissipation component in response to the computing device completing the boot process is based on determining that the received temperature information is higher than the ambient temperature.

20. The non-transitory computer readable medium of claim 13, wherein modifying the thermal profile of the computing device in response to the computing device completing the boot process is based on determining that the received temperature information is higher than the ambient temperature.

* * * * *

UNITED STATES PATENT AND TRADEMARK OFFICE
CERTIFICATE OF CORRECTION

| | | |
|---|---|---|
| PATENT NO. | : 9,727,346 B2 | Page 1 of 1 |
| APPLICATION NO. | : 14/893950 | |
| DATED | : August 8, 2017 | |
| INVENTOR(S) | : Hua Shao | |

It is certified that error appears in the above-identified patent and that said Letters Patent is hereby corrected as shown below:

On the Title Page

In item (72), Name of the Inventor, in Column 1, Line 1, delete "Huo Shao" and insert -- Hua Shao --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*